United States Patent [19]

Christe et al.

[11] 4,163,773

[45] Aug. 7, 1979

[54] SELF-CLINKERING BURNING RATE MODIFIER FOR SOLID PROPELLANT $NF_3$-$F_2$ GAS GENERATORS FOR CHEMICAL HF-DF LASERS

[75] Inventors: Karl O. Christe, Calabasas; Carl J. Schack, Chattsworth, both of Calif.

[73] Assignee: The United States of America as represented by the Secretary of the Navy, Washington, D.C.

[21] Appl. No.: 970,775

[22] Filed: Dec. 18, 1978

[51] Int. Cl.$^2$ ............................................. C01B 21/18
[52] U.S. Cl. .................................... 423/351; 423/462; 149/119
[58] Field of Search ...................... 423/351, 462, 466; 149/19.3, 119

[56] References Cited

U.S. PATENT DOCUMENTS

| | | | |
|---|---|---|---|
| 3,980,509 | 9/1976 | Lubowitz et al. | 423/462 |
| 3,981,756 | 9/1976 | Gotzmer, Jr. | 423/462 |
| 4,001,136 | 1/1977 | Channell et al. | 252/187 |

OTHER PUBLICATIONS

Christe et al., Novel and Known $NF_4^+$ Salts, Inorg. Chem., vol. 15, No. 6, 1976, pp. 1275-1282.
Christe et al., Synthesis and Characterization of $NF_4BiF_6$ and Properties of $NF_4SbF_6$, Inorg. Chem. vol. 16, No. 4, pp. 937-940, 1977.
Christe, Synthesis and Characterization of $(NF_4)_2NiF_6$, Inorg. Chem. vol. 16, No. 9, 1977, pp. 2238-2241.

*Primary Examiner*—O. R. Vertiz
*Assistant Examiner*—Thomas W. Ray
*Attorney, Agent, or Firm*—R. S. Sciascia; W. Thom Skeer; L.E.K. Pohl

[57] ABSTRACT

$N_2F_3SnF_5$ is formed by reacting $N_2F_3SbF_6$ and $Cs_2SnF_6$ in the presence of HF. $N_2F_3SnF_5$ is useful as a component of $NF_3$-$F_2$ gas generating compositions.

2 Claims, No Drawings

SELF-CLINKERING BURNING RATE MODIFIER FOR SOLID PROPELLANT $NF_3$-$F_2$ GAS GENERATORS FOR CHEMICAL HF-DF LASERS

BACKGROUND OF THE INVENTION

1. Field of the Invention

This invention relates to a composition of matter which is useful in $NF_3$-$F_2$ gas generator formulations.

2. Description of the Prior Art

In the recent past, certain new self-clinkering $NF_4^+$ salts have been synthesized. Among these are $(NF_4)_2SnF_6$, $NF_4SnF_5$, $(NF_4)_2TiF_6$, $NF_4TiF_9$, $NF_4Ti_3F_{13}$, $NF_4Ti_6F_{25}$ and $(NF_4)_2NiF_6$. When such self-clinkering salts are utilized as oxidizers and combined with a fuel such as aluminum, $NF_3$ gas, $F_2$ gas and solids are produced when the combination is burned. The gases are useful as lasing materials. The fact that solids or "clinkers" are produced is important in that it overcomes a disadvantage present when, for example $NF_4BF_4$ is used as the oxidizer. When $NF_4BF_4$ is used, $NF_3$, $F_2$ and another gas, $BF_3$, are produced. The gaseous $BF_3$ is not useful as a laser material and acts to deactivate the laser. By producing a solid or "clinker" instead of gases other than $NF_3$ and $F_2$, the self-clinkering salts overcome this problem.

Frequently, formulations containing $NF_4^+$ salts require burning rate modifiers. Typically, $N_2F_3^+$ salts which are more reactive than $NF_4^+$ salts can be used. However, insofar as is known from the prior art, no self-clinkering $N_2F_3^+$ salts are available.

SUMMARY OF THE INVENTION

According to this invention, a self-clinkering $N_2F_3^+$ salt which is useful as a burning rate modifier has been prepared. The salt has the formula $N_2F_3SnF_5$. Synthesis is accomplished by means of a reaction between $N_2F_3SbF_6$ and $Cs_2SnF_6$ in HF. Insofar as is known by the inventors, the salt of this invention is the first self-clinkering $N_2F_3^+$ salt ever produced.

DESCRIPTION OF THE PREFERRED EMBODIMENT

The salt, $N_2F_3SbF_6$, may be prepared according to the procedure set forth in the following example

EXAMPLE I

Synthesis of $N_2F_3SbF_6$. A Teflon ampule, containing a Teflon coated magnetic stirring bar and equipped with a stainless steel valve, was loaded with 14.4 mmol of $SbF_5$ in a glovebox. The ampule was then attached to a vacuum line and 2 ml of anhydrous HF was condensed into the ampule at $-78°$ C. while stirring and warming to ambient temperature. The system was then pressurized with $N_2F_4$ (1 atm). A gradual decrease in the pressure was noted due to uptake of $N_2F_4$. Periodic cycling to below $0°$ C. seemed to increase the rate of $N_2F_4$ uptake. After several hours the unreacted $N_2F_4$ and HF solvent were pumped off at $40°$ C. until constant weight was achieved. The observed weight gain corresponded to the reaction of 12.1 mmol of $N_2F_4$. When the reaction was repeated on a larger scale with 8 ml HF for 3 days, it was found that 74.0 mmol of $SbF_5$ reacted with 73.5 mmol of $N_2F_4$ to give 23.66 g of $N_2F_3SbF_6$ (weight calcd for 74.0 mmol of $N_2F_3SbF_6$ 23.74 g), which was characterized by $^{19}F$ NMR and vibrational spectroscopy.

To produce the salt of this invention, $N_2F_3SnF_5$, one utilizes $N_2F_3SbF_6$ obtained from Example 1 and $Cs_2SnF_6$ and carries out the procedure set forth in the following example.

EXAMPLE II

Solid $N_2F_3SbF_6$ (6.43 mmol) and $Cs_2SnF_6$ (3.24 mmol) were placed in a well passivated (with $ClF_3$) Monel vacuum line equipped with Teflon-FEP U traps and diaphragm values. Approximately 2 ml of anhyrous HF was added. After stirring and shaking vigorously for 30 minutes at room temperature, some of the HF was removed under vacuum and the mixture was cooled to $-78°$ C. The solid and liquid phases were separated by pressure filtration and the volatile products were removed by pumping at $25°$ C. for 15 hours. The volatile material was separated by fractional consideration and consisted of the HF solvent and $N_2F_4$ (3.2 mmol). The filtrate residue (0.3 g) was analyzed by means of vibrational and NMR spectroscopy and shown to be $N_2F_3SnF_5$.

When $N_2F_3SnF_5$ is combined with a fuel such as aluminum and burned $NF_3$ gas, $F_2$ gas, $N_2$ gas and a solid are obtained. (Since $N_2$ is normally used as an inert diluent its formation does not degrade the performance of a laser.) Thus $N_2F_3SnF_5$ is self-clinkering. That is, a non-gaseous product (the solid or "clinker") rather than a gaseous product (such as the $BF_3$ produced when $NF_4BF_4$ is burned) results upon burning of $N_2F_3SnF_5$. In addition, the useful gases $NF_3$ and $F_2$ (and $N_2$) are produced. Insofar as is known by the inventors, $N_2F_3SnF_5$ is the only self-clinkering $N_2F_3^+$ salt that has ever been produced to date.

What is claimed is:

1. $N_2F_3SnF_5$.

2. A method for preparing $N_2F_3SnF_5$ comprising the steps of:
   forming a solution of $N_2F_3SbF_6$ salt and $Cs_2SnF_6$ salt in HF;
   allowing the salts to react.

* * * * *